(12) United States Patent  
Ichikawa et al.

(10) Patent No.: US 7,784,765 B2  
(45) Date of Patent: Aug. 31, 2010

(54) MOLD, METHOD FOR PRODUCING THE SAME AND MAGNETIC RECORDING MEDIUM

(75) Inventors: Kenji Ichikawa, Kanagawa (JP); Seiji Kasahara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 195 days.

(21) Appl. No.: 11/987,167

(22) Filed: Nov. 28, 2007

(65) Prior Publication Data

US 2008/0143020 A1  Jun. 19, 2008

(30) Foreign Application Priority Data

Dec. 1, 2006 (JP) ............................ 2006-326044

(51) Int. Cl.  
*B29C 59/00* (2006.01)  
*B29C 33/00* (2006.01)  
(52) U.S. Cl. ................. 249/116; 264/293; 425/385  
(58) Field of Classification Search .............. 425/385; 264/293; 249/116  
See application file for complete search history.

(56) References Cited

U.S. PATENT DOCUMENTS 6,068,739 A * 5/2000 Suzuki et al. ............ 204/192.2  
2006/0177699 A1 * 8/2006 Ichikawa et al. ............ 428/826

FOREIGN PATENT DOCUMENTS

| JP | 2000-195042 A | 7/2000 |
|----|---------------|--------|
| JP | 2001-256644 A | 9/2001 |
| JP | 2005-353164 A | 12/2005 |
| JP | 2006-216204 A | 8/2006 |
| JP | 2006-221692 A | 8/2006 |
| JP | 2006-228316 A | 8/2006 |

* cited by examiner

*Primary Examiner*—Maria Veronica D Ewald  
(74) *Attorney, Agent, or Firm*—Sughrue Mion, PLLC

(57) ABSTRACT

There is provided a mold which contains at least two electroforming layers, wherein the mold has a concavo-convex pattern on a surface thereof, and the electroforming layers include at least two adjacent layers having the same crystal orientation.

9 Claims, 11 Drawing Sheets  
(3 of 11 Drawing Sheet(s) Filed in Color)

MOLD, METHOD FOR PRODUCING THE SAME AND MAGNETIC RECORDING MEDIUM

BACKGROUND OF THE INVENTION

1. Field of the Invention

The present invention relates to a mold suitable for a stamper for a discrete track medium, a stamper for a patterned medium, a master disk for magnetic transfer, and the like; a method for producing the mold; and a magnetic recording medium.

2. Description of the Related Art

In recent years, for magnetic recording media, remarkable increase in surface recording density has been achieved by means of improvements such as reduction in the size of magnetic particles constituting recording layers thereof, alteration of materials and minuteness in head processing, and, for the future too, further increase in surface recording density is hoped for.

However, problems such as limitations of head processing, incorrect recording of information to another track situated next to a target recording track stemming from the widening of a magnetic field, and crosstalk at the time of reproduction have become conspicuous, and thus surface recording density can hardly be increased by conventional improved methods anymore. Accordingly, a discrete track medium and a patterned medium, in which a concavo-convex pattern is provided or a magnetic layer is divided to reduce magnetic interaction caused between tracks, have been proposed as potential magnetic recording media that make it possible to increase surface recording density further (refer to Japanese Patent Application Laid-Open (JP-A) No. 2000-195042). In the case of the discrete track medium, a recording layer is created in the form of a track pattern in a data region. In the case of the patterned medium, a recording layer is created in the form of a pattern such as bits. Also, in the case of the discrete track medium and the patterned medium, the recording layers are created in the form of servo patterns.

It is proposed that concavo-convex patterns in such magnetic recording media be formed in accordance with a nanoimprinting lithography method (an imprinting method whereby a concavo-convex pattern of a nanometer size is formed; hereinafter otherwise referred to as "imprinting method"), in which by pressing a mold (hereinafter otherwise referred to as "stamper") having a concavo-convex pattern of a nanometer size against a resinous layer on a base material and so transferring the concavo-convex shape of the mold onto the resinous layer, the concavo-convex pattern of a nanometer size is formed on the base material (refer to Japanese Patent Application Laid-Open (JP-A) No. 2005-353164).

The stamper is typically produced by an electroforming step in which an original plate where information has been formed as a concavo-convex pattern is electroformed, then a metal plate formed of an electroforming layer is laid on the original plate and the concavo-convex pattern is transferred onto the metal plate surface, and a peeling step in which the metal plate is peeled off the original plate.

However, conventional stampers produced by the above-mentioned method are not necessarily flat but often warped or distorted. Hence, there is a problem that highly accurate concavo-convex patterns cannot be formed, as concavo-convex patterns formed are deformed or distorted.

Also, as to magnetic disks (hard disks) used for hard disk drives that have been rapidly spreading in recent years, format information and address information are typically written to them after they have been delivered from magnetic disk makers to drive makers and before they are incorporated in the drives. Although this writing can be conducted by means of a magnetic head, a method of transferring format information and address information at one time by means of a mold (hereinafter otherwise referred to as "master disk") to which the format information and the address information have been written is more efficient and desirable.

As to this magnetic transfer method of transferring format information and address information at one time, when a master disk and a transfer target disk (slave disk) are closely attached to each other, by applying a transfer magnetic field to either or both surfaces thereof with a magnetic field generator such as an electromagnetic device or permanent magnet device, information (e.g. a servo signal) which the master disk has is magnetically transferred onto the slave disk. And it is very important that the master disk and the slave disk be closely attached to each other evenly with no space in between so as to conduct the magnetic transfer accurately.

Incidentally, for the master disk used in this magnetic transfer method, a master disk in which a concavo-convex pattern corresponding to an information signal is formed on the surface of a substrate, and the surface of this concavo-convex pattern is covered with a magnetic layer is normally used, as in Japanese Patent Application Laid-Open (JP-A) No. 2001-256644, for example. This master disk for magnetic transfer is typically produced by covering the surface of the concavo-convex pattern with the magnetic layer after undergoing an electroforming step in which an original plate where information has been formed as a concavo-convex pattern is electroformed, then a metal plate formed of an electroforming layer is laid on the original plate and the concavo-convex pattern is transferred onto the metal plate surface; a peeling step in which the metal plate is peeled off the original plate; and a punching step in which the metal plate peeled off is cut by punching into a predetermined size.

However, conventional master disks produced by the above-mentioned method are not necessarily flat but often warped or distorted as a result of being deformed at the times of processes exemplified by the peeling step in which metal plates are peeled off original plates and the punching step in which the metal plates are cut by punching into predetermined sizes. In addition, warpage and distortion may be caused by internal stress of electroforming layers in a photo-etching step as well. When a master disk is warped or distorted as just described, there is a problem that it is impossible to improve the state in which the master disk and a slave disk are closely attached to each other and thus impossible to perform highly accurate magnetic transfer.

In attempts to solve the forgoing problems, the back surface of a master disk is provided with a buffer (cushion material), adhesive pressure is increased, air on the interface where the master disk and a slave disk are closely attached is removed by means of vacuum suction, and so forth, in order for the master disk to be attached to the slave disk more closely. However, despite these attempts, the problems with adhesion have not completely been solved; in essence, it is necessary to improve the flatness of the master disk by removing the warpage or distortion of the master disk. Also, there is a possibility that increasing adhesive pressure may damage or deform a concavo-convex pattern of the master disk, hence a cause of decrease in the durability of the master disk.

Accordingly, the present inventors have already proposed a master substrate wherein an electroforming layer constituting a metal plate with a surface to which a concavo-convex pattern corresponding to transfer information has been transferred is formed of a multilayer structure of different grain sizes (Japanese Patent Application Laid-Open (JP-A) No. 2006-216204); a master substrate wherein an electroforming layer constituting a metal plate is formed of a three-layer structure in which between first and third layers having the same crystal orientation, a second layer having a different crystal orientation from that of those two layers is sandwiched (Japanese Patent Application Laid-Open (JP-A) No. 2006-221692); a master substrate wherein an electroforming layer constituting a metal plate is formed of two or more layers having different crystal orientations (Japanese Patent Application Laid-Open (JP-A) No. 2006-228316); and so forth.

According to these proposals, the amount of warpage and the amount of distortion can be reduced, and master disks for magnetic transfer which are superior in flatness can therefore be obtained; however, as things stand, provision of a master disk having greater flatness and a smaller variation in the amount of warpage is hoped for to improve transfer adhesion even further.

BRIEF SUMMARY OF THE INVENTION

The object of the present invention is to provide a mold which is very small in the amount of warpage and superior in flatness, a method for producing a mold in which the variation in the amount of warpage is small and a highly accurate concavo-convex pattern can be efficiently formed, and a magnetic recording medium.

Means for solving the problems are as follows.

<1> A mold containing at least two electroforming layers, wherein the mold has a concavo-convex pattern on a surface thereof, and the electroforming layers include at least two adjacent layers having the same crystal orientation.

<2> The mold according to <1>, wherein each of the electroforming layers contains Ni.

<3> The mold according to <2>, wherein the at least two adjacent layers have the same crystal orientation in which Ni (110) is a preferred orientation.

<4> The mold according to any one of <2> or <3>, wherein the electroforming layers include at least three layers, and at least first and second layers from a side of the concavo-convex pattern have the same crystal orientation in which Ni (110) is a preferred orientation.

<5> The mold according to any one of <1> to <4>, wherein the mold has an amount of warpage of less than or equal to ±50 μm.

<6> The mold according to any one of <1> to <5>, wherein a total thickness of the electroforming layers is 100 μm to 350 μm.

<7> The mold according to any one of <1> to <7>, wherein the mold is any one of a stamper for a discrete track medium, a stamper for a patterned medium, or a master disk for magnetic transfer.

<8> A method for producing a mold, containing: electroforming a metal plate containing two or more electroforming layers including at least two adjacent layers having the same crystal orientation on an original plate having a concavo-convex pattern on a surface thereof so as to transfer the concavo-convex pattern onto a face of the metal plate; and separating the metal plate from the original plate so as to yield a mold.

<9> A method for forming a concavo-convex pattern, containing: placing the mold according to any one of <1> to <7> on a surface of a resin layer disposed on a substrate so as to transfer a concavo-convex pattern of the mold onto the resin layer.

<10> A method for recording a magnetic recording medium, containing: recording at least one of a track for recording data or servo information on the magnetic recording medium by using the mold according to any one of <1> to <7>.

A mold of the present invention has a concavo-convex pattern on the surface thereof, and contains at least two electroforming layers, wherein the electroforming layers include at least two adjacent layers having the same crystal orientation. The mold of the present invention is able to prevent the formation of warpage as the mold has at least two electroforming layers having the same crystal orientation, the physical properties, and the stress distribution in the direction of the layer thickness contrary to the case where the electroforming layer is formed from a single layer. In addition, the mold of the present invention is able to prevent crystal grains from becoming coarse by laminating two or more electroforming layers. As a result, shear resistance of the mold when the layers are cut by punching becomes higher than in the case of a single-layer structure, the amount of warpage is therefore very small, and the flatness of the mold is greatly improved. The mold of the present invention can be suitably used for any of a stamper for a discrete track medium, a stamper for a patterned medium, or a master disk for magnetic transfer.

A method for producing a mold, containing: electroforming a metal plate containing two or more electroforming layers including at least two adjacent layers having the same crystal orientation on an original plate having a concavo-convex pattern on a surface thereof so as to transfer the concavo-convex pattern onto a face of the metal plate; and separating the metal plate from the original plate so as to yield a mold.

In the method for producing a mold of the present invention, by forming a mold of a metal plate containing two or more electroforming layers including at least two adjacent layers having the same crystal orientation, it is possible to efficiently produce the mold in which the electroforming layers are provided such that the variation in the amount of warpage is small and a highly accurate concavo-convex pattern can be formed.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Mold

Figure 1:
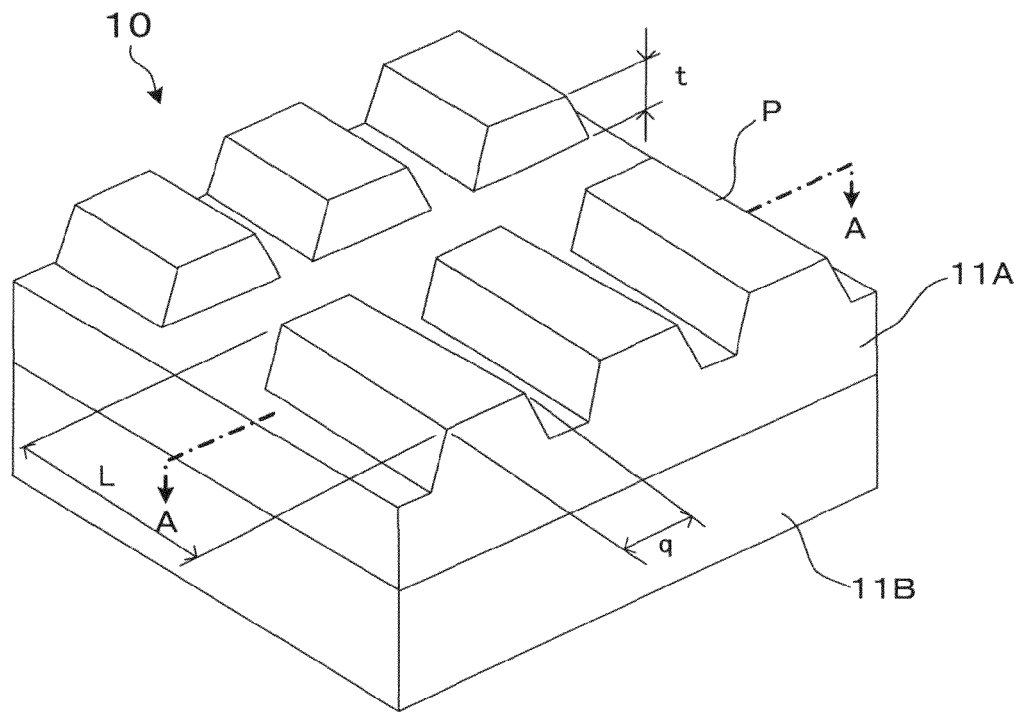
FIG. 1 is a partially perspective view showing one example of a mold of the present invention.

A mold of the present invention contains at least two electroforming layers and has a conductive layer, additionally containing other layers according to necessity.

A concavo-convex pattern corresponding to at least one of a data recording track and servo information is formed on the surface of the mold.

—Electroforming Layers—

The electroforming layers constitute a metal plate of the mold, and the shape, size, material and the like thereof are not particularly limited and can be suitably selected according to the purpose; for example, the size and shape can be suitably selected according to use, etc.

Examples of the material include metals such as Ni, Cu, Al, Mo, Co, Cr, Ta, Pd, Pt and Au, or alloys thereof. Amongst these, Ni and Ni alloy are particularly preferable.

The electroforming layers are formed of at least two layers, preferably three or more layers, and may be formed as a multilayer structure with four or more layers.

Amongst the electroforming layers formed of a laminated structure with at least two layers, at least two adjacent layers have the same crystal orientation. In this case, it is desirable that at least two adjacent electroforming layers have the same crystal orientation in which Ni (110) is the preferred orientation. Note that Ni (110) denotes Miller index of nickel.

Also, it is desirable that the electroforming layers be formed of at least three layers, and at least first and second layers from the concavo-convex pattern side have the same crystal orientation in which Ni (110) is the preferred orientation. It is more desirable that all the electroforming layers have the same crystal orientation in which Ni (110) is the preferred orientation.

Here, the distribution of crystal orientation in cross section of the electroforming layers can be calculated, for example by means of the electron backscatter diffraction pattern (EBSD). The EBSD is a method for analyzing a crystal orientation on the basis of a backscatter of a primary electron, as a scanning electron microscope (SEM) is provided with a dedicated detector.

Such electroforming layers amongst which at least two adjacent layers have the same crystal orientation can be formed by controlling the current density and the current profile in an electroforming process in the after-mentioned method for producing the mold of the present invention.

The total thickness of the electroforming layers is not particularly limited and can be suitably selected according to the purpose, and it is normally 100 μm to 350 μm or so.

—Conductive Layer—

As to the conductive layer, the material, shape, structure, size and the like thereof are not particularly limited and can be suitably selected according to the purpose; for example, the structure may be a single-layer structure or a laminated structure, and the size can be suitably selected according to use, etc.

The material is not particularly limited and can be suitably selected according to the purpose; examples of the material include Ni, Nb, Ta, Ti, W, Cr, Co, Pt, Cu, Ir, Rh, Fe and Ru, or alloys thereof. Each of these may be used alone or in combination with two or more.

The formation method of the conductive layer is not particularly limited and can be suitably selected according to the purpose; examples thereof include a plating method, a printing process, a sputtering method, a CVD process and an evaporation method.

The thickness of the conductive layer is not particularly limited and can be suitably selected according to the purpose; it is preferably 5 nm to 200 nm, more preferably 7 nm to 150 nm.

—Other Layers—

The mold can be suitably used for any one of a stamper for a discrete track medium, a stamper for a patterned medium, or a master disk for magnetic transfer.

In the case where the mold is formed as a stamper for a discrete track medium or a stamper for a patterned medium, it is desirable that a releasing layer containing a fluorine-based material be disposed on a surface of the concavo-convex pattern, as it is possible to improve mold release properties between the stamper and a resinous layer in carrying out nanoimprinting with the use of the stamper. Additionally, it is also possible to provide a protective film of diamond-like carbon (DLC), sputtered carbon, etc. on the concavo-convex pattern of the electroforming layers.

In the case where the mold is formed as a master disk for magnetic transfer, it is desirable that a magnetic layer be disposed on a surface of the concavo-convex pattern surface of the electroforming layers.

The magnetic material for the magnetic layer is not particularly limited and can be suitably selected according to the purpose; examples thereof include Co/Co alloys (such as CoNi, CoNiZr and CoNbTaZr), Fe/Fe alloys (such as FeCo, FeCoNi, FeNiMo, FeAlSi, FeAl and FeTaN) and Ni/Ni alloys (such as NiFe). Amongst these, FeCo and FeCoNi are particularly preferable.

The formation method of the magnetic layer is not particularly limited and can be suitably selected according to the purpose. Examples thereof include vacuum deposition methods such as a vacuum evaporation method, a sputtering method and an ion plating method; a plating method; and a coating method.

The thickness of the magnetic layer is not particularly limited and can be suitably selected according to the purpose; it is preferably 5 nm to 200 nm, more preferably 10 nm to 150 nm.

Additionally, it is desirable that a protective film of diamond-like carbon (DLC), sputtered carbon, etc. be provided on the magnetic layer, and further, a lubricant layer may be provided on the protective film. In this case, it is desirable that there be a DLC film of 3 nm to 30 nm in thickness as a protective film, and a lubricant layer. Additionally, an adhesion-enhancing layer of Si, etc. may be provided between the magnetic layer and the protective film. The lubricant has the effect of preventing deterioration in durability that results from the occurrence of scratches due to friction, etc. in correcting displacement caused when the master disk is in contact with a slave disk.

—Amount of Warpage of Mold—

When the mold has a disk size of 2.5 inches, for example, it is desirable that the amount of warpage thereof be less than or equal to ±50 μm, more desirably less than or equal to ±30 μm, even more desirably less than or equal to ±20 μm. If the aforesaid amount of warpage is less than ±50 μm, adhesive force becomes great when a concavo-convex pattern is formed in a resist layer; thus, it becomes difficult to separate the mold from the resist layer, and a great deal of resist residue may arise on the mold surface. Note that the amount of warpage of the mold can also be applied to disks other than those having a size of 2.5 inches, for example to disks having sizes of 0.85 inches, 1 inch and 1.8 inches. "+" and "−" of the aforesaid amount of warpage mean opposite directions in which the mold is warped.

The amount of warpage of the mold is measured, for example, by fixing the mold to a spindle motor and rotating the mold at a rotational speed of 10 rpm. A laser displacement meter (LC-2430, produced by Keyence Corporation) is set in such a manner as to be perpendicular to the surface of the mold, and the amount of displacement in the vertical direction with respect to one rotation in the radial position is measured; afterward, as the laser displacement meter is shifted in the radial direction on a 1 mm basis with a stepping motor, the whole surface (radial position=12.5 mm to 32.5 mm) is measured. Then the average value of data is calculated by the radius, and the difference between the maximum and minimum values when the radii and the average values are plotted is defined as the amount of warpage.

The aforesaid amount of warpage relates to a deformation in which an inner circumferential site and an outer circumferential site of the mold differ in height even when there is no distortion during one rotation of the mold, namely on one track, which is exemplified by a spherical deformation. Therefore, the amount of warpage is calculated as the difference between the track with the highest displacement value and the track with the lowest displacement value, when the displacement values measured in relation to each concentric track by the laser displacement meter are averaged in the aforesaid measurement of the amount of distortion.

Figure 2:
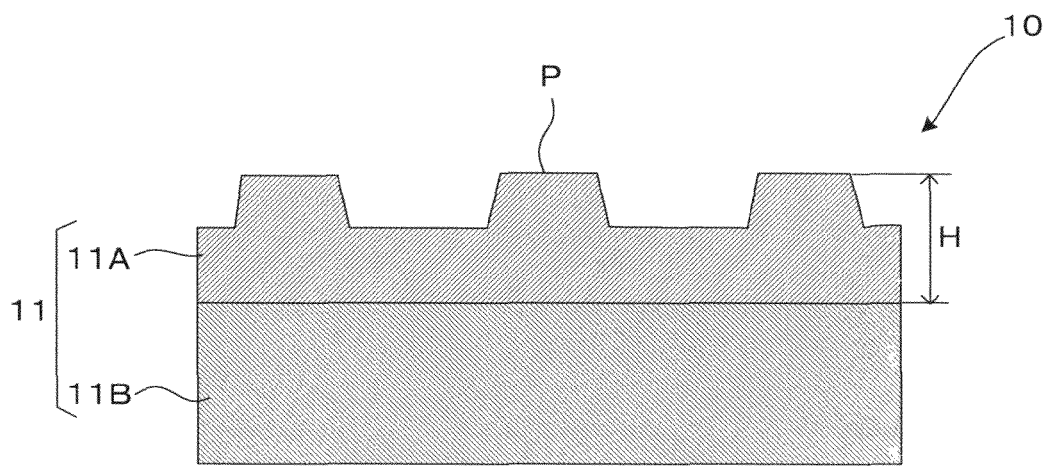
FIG. 2 is a schematic cross-sectional view of the mold as seen across the line A-A in FIG. 1.

Here, specific examples of the mold of the present invention are explained with reference to the drawings. FIG. 1 is a partially perspective view showing one example of the mold of the present invention, and FIG. 2 is a schematic cross-sectional view of the mold as seen across the line A-A in FIG. 1. Note that in FIGS. 1 and 2, no layers other than electroforming layers are depicted.

As shown in FIGS. 1 and 2, an electroforming layer 11 is formed of a two-layer structure composed of a first electroforming layer 11A and a second electroforming layer 11B, and the first and second electroforming layers 11A and 11B have the same crystal orientation which is the preferred orientation of Ni (110).

It is desirable that the thickness of the first electroforming layer 11A be 20 μm to 100 μm and the thickness of the second electroforming layer 11B be 40 μm to 250 μm, and it is desirable that the total thickness of the electroforming layer 11 composed of the two layers be 100 μm to 350 μm. Note that the thickness of the first electroforming layer 11A is denoted by "H" in FIG. 2.

Also, on the surface of a mold 10, there is a minute concavo-convex pattern P corresponding to at least one of a data recording track and servo information. This minute concavo-convex pattern P is rectangular in shape when planarly viewed, and consists of a length q in the track direction (arrow direction in the figure) and a length L in the radial direction. Although optimized values of these lengths q and L vary according to the recording density and the recording signal waveform, the lengths q and L can, for example, be made 80 nm and 200 nm respectively. In the case of a servo signal, this minute concavo-convex pattern P is formed for a long distance in the radial direction. In this case, it is desirable that the length L in the radial direction be 0.05 μm to 20 μm and the length q in the track direction (circumferential direction) be 0.01 μm to 5 μm, for example. It is desirable to select a concavo-convex pattern P which has a greater length in the radial direction within these ranges, in terms of a pattern for bearing the servo signal. It is desirable that the height t of the concavo-convex pattern P (the height of the protrusion) be in the range of 30 nm to 800 nm, more desirably in the range of 50 nm to 300 nm.

Figure 3:
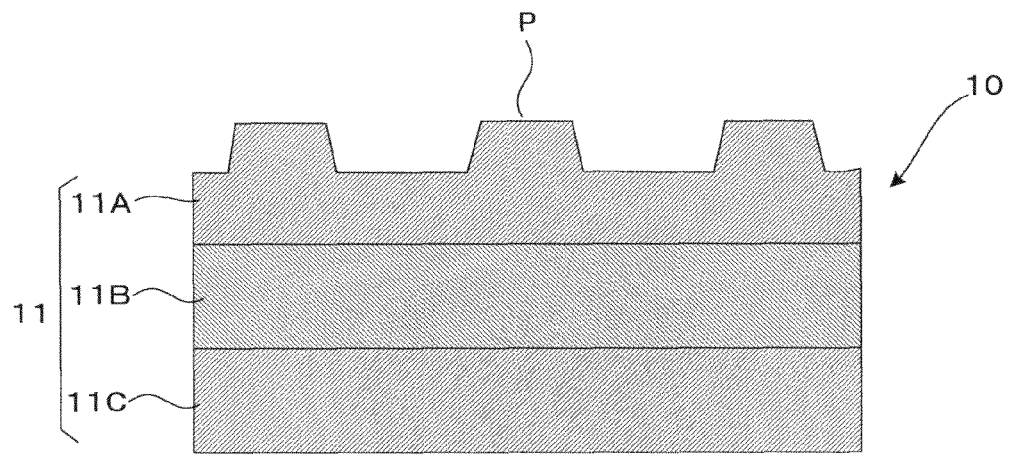
FIG. 3 is a schematic cross-sectional view of another mold of the present invention.

As to the mold shown in FIG. 3, an electroforming layer 11 is formed of a three-layer structure composed of a first electroforming layer 11A, a second electroforming layer 11B and a third electroforming layer 11C, and the first, second and third electroforming layers 11A, 11B and 11C have the same crystal orientation in which Ni (110) is the preferred orientation. It should be noted that the third electroforming layer 11C may have a different crystal orientation as long as the first and second electroforming layers 11A and 11B have the same crystal orientation in which Ni (110) is the preferred orientation.

It is desirable that the thickness of the first electroforming layer 11A be 20 μm to 140 μm, the thickness of the second electroforming layer 11B be 40 μm to 140 μm and the thickness of the third electroforming layer 11C be 10 μm to 70 μm, and it is desirable that the total thickness of the electroforming layer 11 composed of the three layers be 100 μm to 350 μm.

Figure 4:
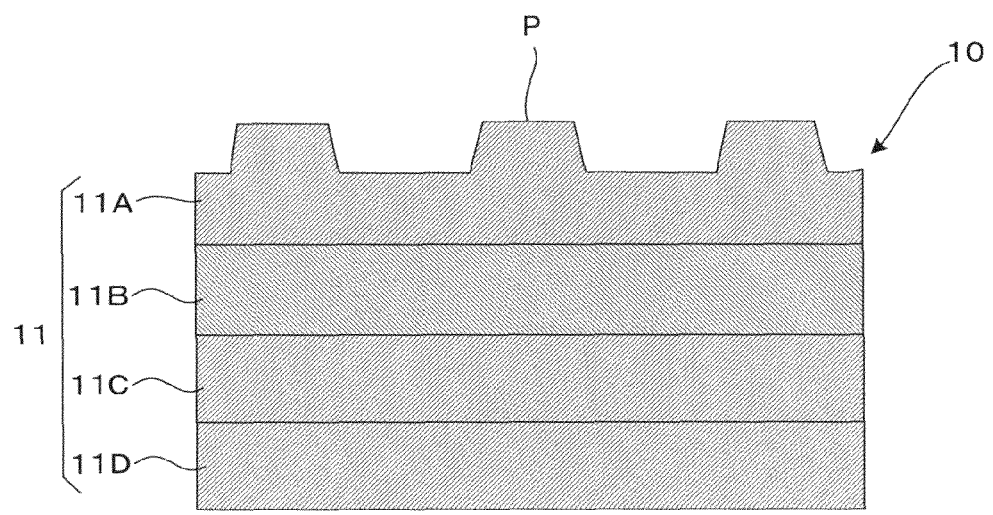
FIG. 4 is a schematic cross-sectional view of yet another mold of the present invention.

As to the mold shown in FIG. 4, an electroforming layer 11 is formed of a four-layer structure composed of a first electroforming layer 11A, a second electroforming layer 11B, a third electroforming layer 11C and a fourth electroforming layer 11D, and the first, second, third and fourth electroforming layers 11A, 11B, 11C and 11D have the same crystal orientation in which Ni (110) is the preferred orientation. It should be noted that the third and fourth electroforming layers 11C and 11D may have different crystal orientations as long as the first and second electroforming layers 11A and 11B have the same crystal orientation in which Ni (110) is the preferred orientation.

It is desirable that the thickness of the first electroforming layer 11A be 20 µm to 90 µm, the thickness of the second electroforming layer 11B be 20 µm to 90 µm, the thickness of the third electroforming layer 11C be 20 µm to 90 µm and the thickness of the fourth electroforming layer 11D be 40 µm to 100 µm, and it is desirable that the total thickness of the electroforming layer 11 composed of the four layers be 100 µm to 350 µm.

(Method for Producing Mold)

A method for producing the mold of the present invention includes an electroforming step and a peeling step, additionally including other steps according to necessity.

The electroforming step is a step of forming a metal plate composed of two or more electroforming layers amongst which at least two adjacent layers have the same crystal orientation on an original plate with a concavo-convex pattern on its surface, and transferring the concavo-convex pattern onto the metal plate surface. Details of the electroforming process will be described below.

The peeling step is a step of peeling the metal plate off the original plate to yield a mold.

The peeling is not particularly limited and can be suitably selected according to the purpose; examples thereof include a method in which a metal plate is peeled off by carrying out a wet etching process on a laminated construction formed of a conductive layer, an electroforming layer and an original plate and thus removing the original plate.

Here, FIGS. 5A to 5E are process diagrams showing a method for producing the mold of the present invention.

Figure 5A:
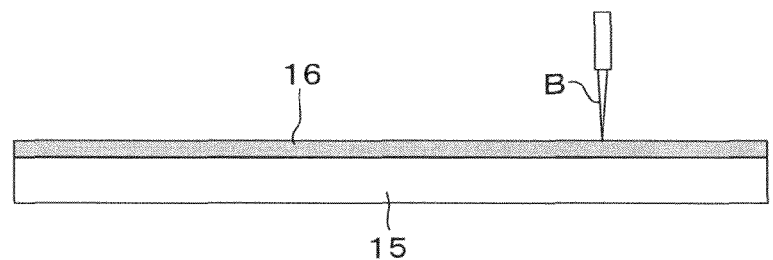
FIG. 5A is a diagram showing a step of forming a resist film on a substrate and baking the resist film in a method for producing a mold of the present invention.

First of all, as shown in FIG. 5A, on a substrate 15 made of a silicon wafer whose surface is flat, smooth and clean (which may also be made of a glass plate or quartz plate), there is formation of an adhesive layer, etc. as a pretreatment, then a resist film 16 is formed by applying an electron beam resist solution by means of spin coating, etc. and baked. The material for the resist film may be any one of a positive-type resist material and a negative-type resist material.

Figure 5B:
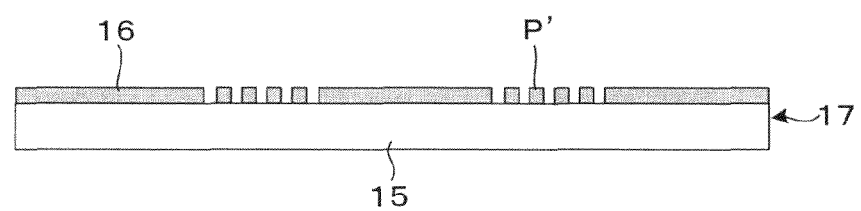
FIG. 5B is a diagram showing an exposing step in a method for producing a mold of the present invention.

Next, as shown in FIG. 5B, in an electron beam exposer (not shown in the figure) provided with a highly accurate rotational stage or X-Y stage, the substrate 15 mounted on the stage is irradiated with an electron beam modulated correspondingly to a servo signal or the like, and a desired concavo-convex pattern P' is created in the resist film 16 by means of drawing exposure.

Figure 5C:
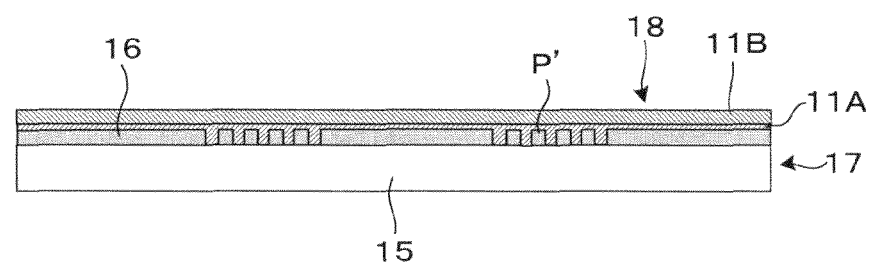
FIG. 5C is a diagram showing a step of forming a concavo-convex pattern in a method for producing a mold of the present invention.

Then, as shown in FIG. 5C, the resist film 16 undergoes a developing process, and the desired concavo-convex pattern P' is formed by the residual resist film 16 from which the exposed portion has been removed. A conductive layer (not shown in the figure) is provided on this concavo-convex pattern P', for example by means of sputtering, and an original plate 17 which can be electroformed is thus produced.

Subsequently, as shown in FIG. 5C, the whole surface of the original plate 17 is electroformed with an electroforming apparatus (not shown in the figure), and a metal plate 18 made of Ni metal (an Ni electroforming layer) with a desired thickness and a desired crystal orientation is laid thereupon.

In the present invention, by controlling the current density and the current profile in the electroforming process, electroforming layers amongst which at least two adjacent layers have the same crystal orientation are formed. Specifically, while the original plate 17 provided with the conductive layer is rotated at a rotational speed of 50 rpm to 150 rpm, immersed in an Ni electroforming bath, the current density of a current applied into the Ni electroforming bath is changed as shown in FIG. 6; by dosing so, electroforming layers amongst which at least two adjacent layers have the same crystal orientation in which Ni (110) is the preferred orientation are formed.

Figure 6:
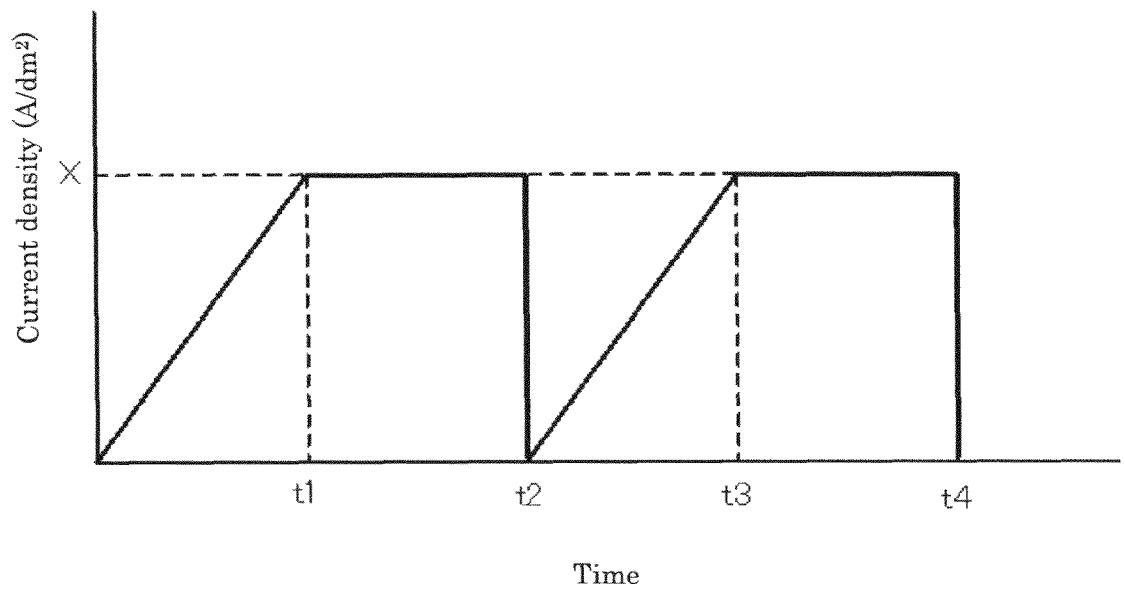
FIG. 6 is a graph showing the relationship between time and current density in an electroforming process.

Here, FIG. 6 shows the change in the current density ($A/dm^2$) to the electroforming time. As to the formation of the first electroforming layer 11A that is a component of the concavo-convex pattern surface side (the side of the surface which makes contact with the original plate 17, where the concavo-convex pattern P is transferred), the first electroforming layer 11A has a crystal orientation in which Ni (110) is the preferred orientation, and is electroformed with such a current density as to be able to cover a minute concavo-convex pattern correspondingly with the shape thereof. Accordingly, the current density is set at X ($A/dm^2$) in FIG. 6 such that Ni (110) becomes the preferred orientation, by means of EBSD. Although the current density X varies somewhat according to the Ni electroforming bath and the electroforming condition, it is desirable that the current density X be set in the range of 1 $A/dm^2$ to 7 $A/dm^2$. The rate at which the current density X attains the set current density X is 0.3 $A/dm^2$ per min. When it has attained the set current density X (t1), it is sustained for a predetermined period of time (t1 to t2) such that the first electroforming layer 11A with a crystal orientation in which Ni (110) is the preferred orientation has a predetermined thickness (for example 50 µm). Thus, the first electroforming layer 11A is formed.

Next, the current density X ($A/dm^2$) with which the first electroforming layer 11A has been formed is rapidly lowered to 0.1 ($A/dm^2$). Afterward, the current density X is raised to the set current density X, and when it has attained the set current density X (t3), it is sustained for a predetermined period of time (t3 to t4) such that the second electroforming layer 11B with a crystal orientation in which Ni (110) is the preferred orientation has a predetermined thickness (for example 50 µm). Thus, the second electroforming layer 11B is formed.

As described above, as an electroforming layer constituting the metal plate 18 is formed of the first electroforming layer 11A and the second electroforming layer 11B amongst which at least two adjacent layers have the same crystal orientation, greater stress distribution in the layer thickness direction can be gained; therefore, the form of warpage can be controlled. Also, since it is possible to prevent crystal grains from becoming coarse by providing the metal plate 18 in a laminated form, shear resistance when the layers are cut by punching becomes higher than in the case of a single-layer structure, and the resistance of the overall electroforming layer to warpage and distortion can be controlled.

Additionally, also when an electroforming layer is formed of three or more layers, the electroforming layer can be formed by controlling the current density and the current profile in an electroforming process as described above.

Although the metal normally used for molds is nickel (Ni), it is desirable that when a mold is produced by means of electroforming, a nickel sulfamate bath that makes it easier to obtain a mold with small stress be used. For example, such a nickel sulfamate bath includes 400 g/L to 800 g/L of nickel sulfamate and 20 g/L to 50 g/L of boric acid (supersaturated)

as a base, with an additive such as a surfactant (for example sodium lauryl sulfate) added according to necessity. It is desirable that the bath temperature of a plating bath be 40° C. to 60° C. It is desirable that a nickel ball housed in a titanium case be used for a counter electrode at the time of electroforming.

Figure 5D:
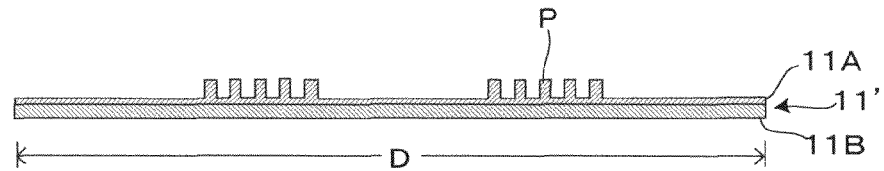
FIG. 5D is a diagram showing a step of peeling a metal plate off an original plate in a method for producing a mold of the present invention.
Figure 5E:
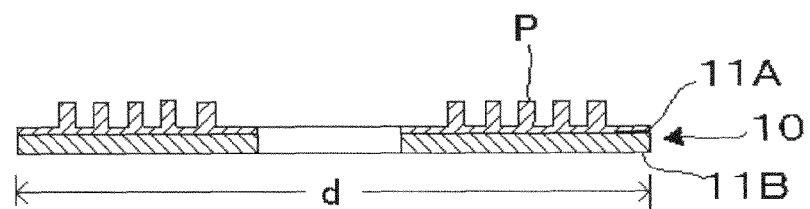
FIG. 5E is a diagram showing a step of cutting a metal plate by punching and thus producing a mold of a predetermined size in a method for producing a mold of the present invention.

Next, this metal plate 18 is peeled off the original plate 17, the residual resist film 16 is removed, and then the metal plate 18 is washed. Thus, as shown in FIG. 5D, an original plate 11' of a mold is obtained, having an inverted concavo-convex pattern P and an outer diameter of D that is the value measured before cut by punching into a predetermined size. This original plate 11' is cut by punching, the surface roughness (Ra) is made less than or equal to 1 µm by polishing the back surface thereof according to necessity, and a mold 10 of the predetermined size with an outer diameter of d, shown in FIG. 5E, is thus obtained.

Examples of the aforesaid other steps include a protective layer forming step. When a master disk for magnetic transfer is produced as the mold, there is included a magnetic layer forming step for forming a magnetic layer on the surface of the mold produced. Additionally, as to a master disk for magnetic transfer, edge finishing is conducted but back surface polishing may not be conducted.

In another method for producing the mold, a second original plate is produced by electroforming the original plate 17. A mold may be made by electroforming this second original plate to produce a metal plate with an inverted concavo-convex pattern, and then cutting the metal plate by punching into a predetermined size. In addition, a mold may be made by electroforming the second original plate or hardening it with an application of resin solution to produce a third original plate, then electroforming this third original plate to produce a metal plate, and peeling off the metal plate with an inverted concavo-convex pattern. A plurality of metal plates 18 can be produced by repeatedly using the second original plate or the third original plate. Also, in producing an original plate, a resist film may be removed after exposing and developing the resist film and then etching it to form a concavo-convex pattern on the surface of the original plate by means of etching.

(Magnetic Recording Medium and Method for Producing Magnetic Recording Medium)

—Imprinting Method—

A method for producing (method for imprinting) a magnetic recording medium in which the mold is used as a stamper for a discrete track medium will be explained.

FIGS. 7A to 7E are schematic cross-sectional views for explaining a method for producing a magnetic recording medium by an imprinting method.

Figure 7A:
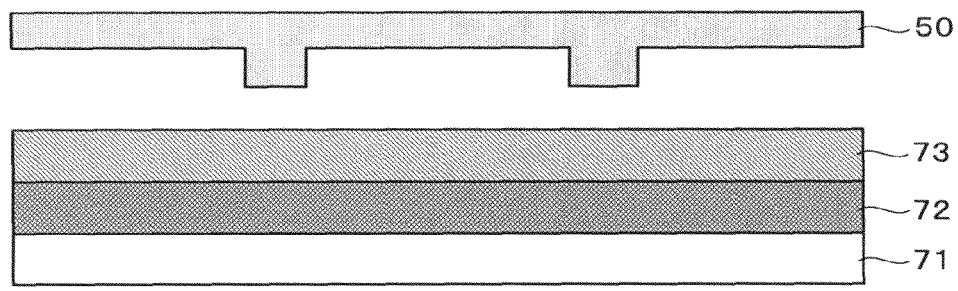
FIG. 7A is a schematic cross-sectional view showing a step of forming a resist layer on a substrate in a method for producing a magnetic recording medium.

First of all, as shown in FIG. 7A, a resist layer 73 is formed by a spin coating process, etc. on a magnetic recording medium substrate 71 having a magnetic layer 72 on the surface thereof, and then a mold (stamper) 50 of the present invention is pressed against the resist layer 73 to transfer a concavo-convex shape onto the resist layer 73. On this occasion, by heating the resist layer at a higher temperature than the glass transition temperature of the resin forming the resist layer, the resist layer becomes soft and easily possible to deform.

The magnetic recording medium substrate 71 has at least the magnetic layer 72 on the substrate, additionally having other layers suitably selected according to necessity. The material for the magnetic layer is not particularly limited and can be suitably selected from known materials according to the purpose; examples thereof include Fe, Co, Ni, FeCo, FeNi, CoNi, CoNiP, FePt, CoPt and NiPt. Each of these may be used alone or in combination with two or more.

The material for the resist layer may be any one of a positive-type resist material and a negative-type resist material.

Figure 7B:
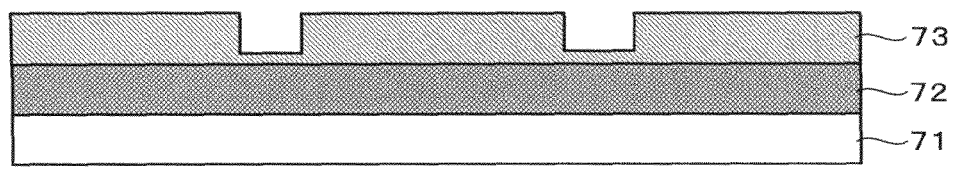
FIG. 7B is a schematic cross-sectional view showing a transfer step by a stamper in a method for producing a magnetic recording medium.

Then, as shown in FIG. 7B, the concavo-convex shape of the mold (stamper) 50 of the present invention is transferred onto the surface of the resist layer 73. On this occasion, there is resist residue caused at the concave bottom of the resist layer 73.

Figure 7C:
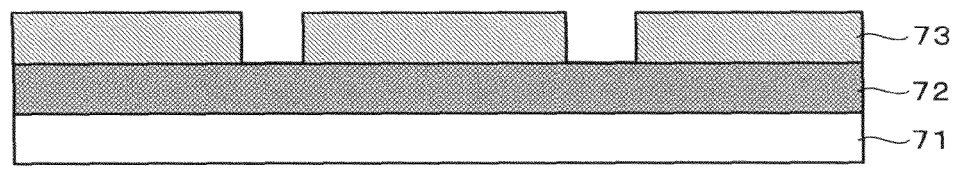
FIG. 7C is a schematic cross-sectional view showing a reactive ion etching step in a method for producing a magnetic recording medium.

Next, as shown in FIG. 7C, the resist residue at the resist concave bottom is removed by means of reactive ion etching, and the magnetic layer 72 is thus exposed.

Figure 7D:
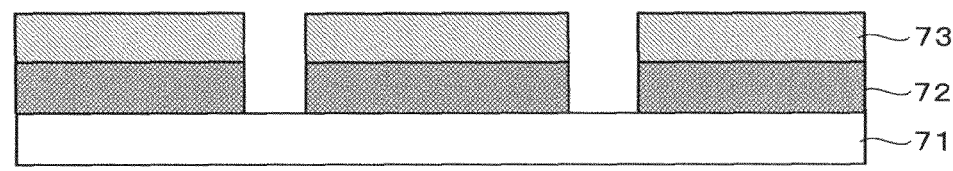
FIG. 7D is a schematic cross-sectional view showing a step of cutting a magnetic layer in a method for producing a magnetic recording medium.

Subsequently, as shown in FIG. 7D, with the concavo-convex shape of the resist layer 73 serving as a mask, the magnetic layer exposing portion is cut in the vertical direction of the substrate with respect to the concave portion by means of ion milling with Ar, etc.

Figure 7E:
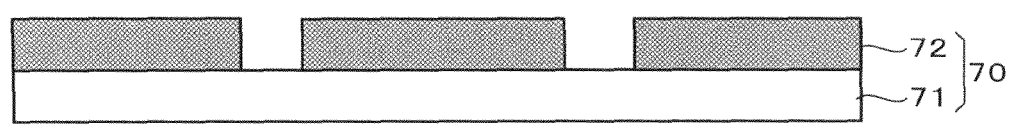
FIG. 7E is a schematic cross-sectional view showing a step of removing a resist layer on a magnetic layer and thus producing a magnetic recording medium with a concavo-convex pattern, in a method for producing a magnetic recording medium.

Next, as shown in FIG. 7E, a discrete-type magnetic recording medium 70 having a concavo-convex pattern is obtained by removing the resist layer 73 on the convex portion of the magnetic layer 72. The concave portion of the magnetic layer may be filled with any one of $SiO_2$, carbon and alumina; polymers such as polymethylmethacrylate (PMMA) and polystyrene (PS); and nonmagnetic materials such as oils for smoothness.

Subsequently, the surface is flattened. A protective film of DLC (diamond-like carbon), etc. is formed on the surface flattened, and finally lubricant is applied. Thus, the magnetic recording medium is produced.

In the imprinting method, it is possible to form an exact concavo-convex pattern (a data recording track) in a highly accurate manner by using the mold (stamper) of the present invention.

—Magnetic Transfer Method—

A magnetic transfer method in which the mold is used as a master disk for magnetic transfer, and a concavo-convex pattern of the master disk is transferred onto a slave disk will be explained.

Figure 8:
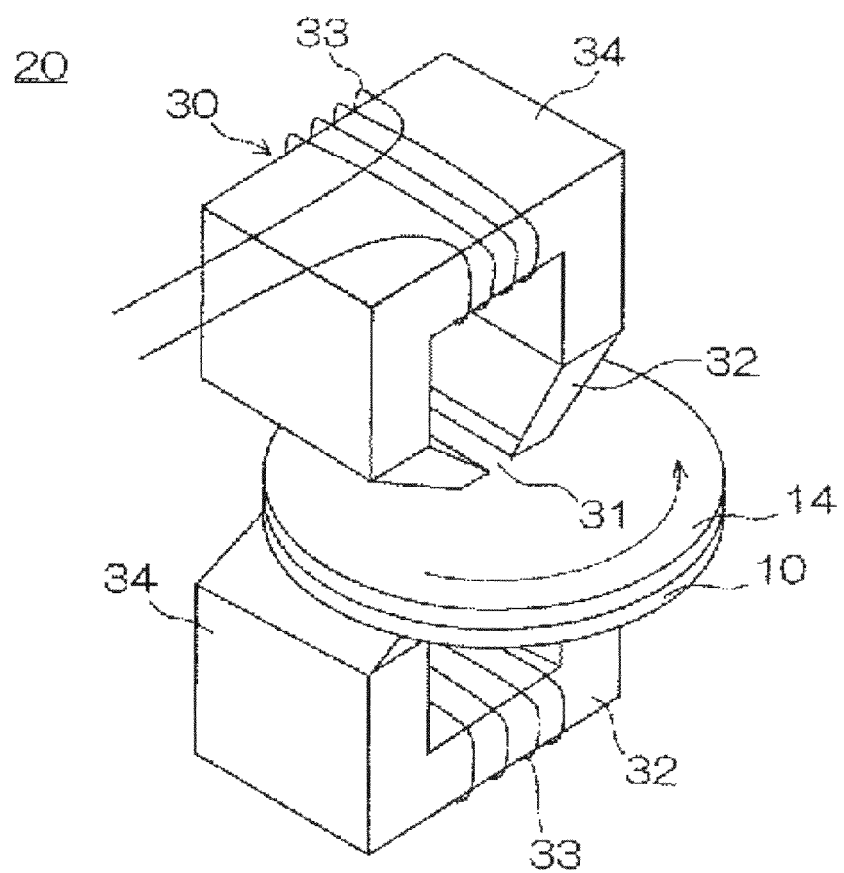
FIG. 8 is a perspective view of main parts of a magnetic transfer apparatus for conducting magnetic transfer with the use of a mold of the present invention.

FIG. 8 is a perspective view of main parts of a magnetic transfer apparatus 20 for conducting magnetic transfer with the use of the mold (master disk) 10 of the present invention.

Figure 10A:
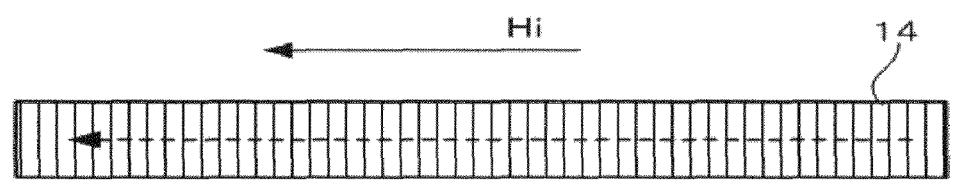
FIG. 10A is an explanatory diagram for explaining a step with respect to a magnetic transfer method by in-plane recording using a mold of the present invention.

At the time of magnetic transfer, the slave surface (magnetic recording surface) of a slave disk 14 having undergone the after-mentioned initial DC magnetization in FIG. 10A is brought into contact with the information bearing surface of the master disk 10 and closely attached thereto with a predetermined pressing force. Then, with the slave disk 14 and the master disk 10 closely attached to each other, transfer magnetic fields are applied by a magnetic field generator 30 so as to transfer the concavo-convex pattern P of the master disk 10 onto the slave disk 14.

The slave disk 14 is a disk-shaped recording medium in which a magnetic recording layer is formed on either or both surfaces thereof, exemplified by a hard disk, flexible disk, etc., and undergoes a cleaning process (such as burnishing) for removing minute protrusions and dust on the surface with a glide head, a polisher or the like according to necessity before closely attached to the master disk 10.

For the magnetic recording layer of the slave disk 14, a coating-type magnetic recording layer, a plating-type magnetic recording layer or a metallic thin film type magnetic recording layer can be employed. Examples of the magnetic material for the metallic thin film type magnetic recording layer include Co and Co alloys (such as CoPtCr, CoCr, CoPtCrTa, CoPtCrNbTa, CoCrB and CoNi), Fe and Fe alloys (such as FeCo, FePt and FeCoNi), and Ni and Ni alloys (such as NiFe). Since these magnetic materials are large in magnetic flux density and have a magnetic field anisotropy in the same direction as the magnetic field applying direction (in-plane direction in the case of in-plane recording), they enable clear magnetic transfer and are therefore favorable. And it is desirable to provide a nonmagnetic underlayer to give a necessary magnetic anisotropy under the magnetic material (on the side of a support). It is necessary for this underlayer to correspond with a magnetic layer 12 in crystal structure and lattice constant. For this reason, it is desirable to use Cr, CrTi, CoCr, CrTa, CrMo, NiAl, Ru, etc. as the material for the underlayer, for example.

Figure 9:
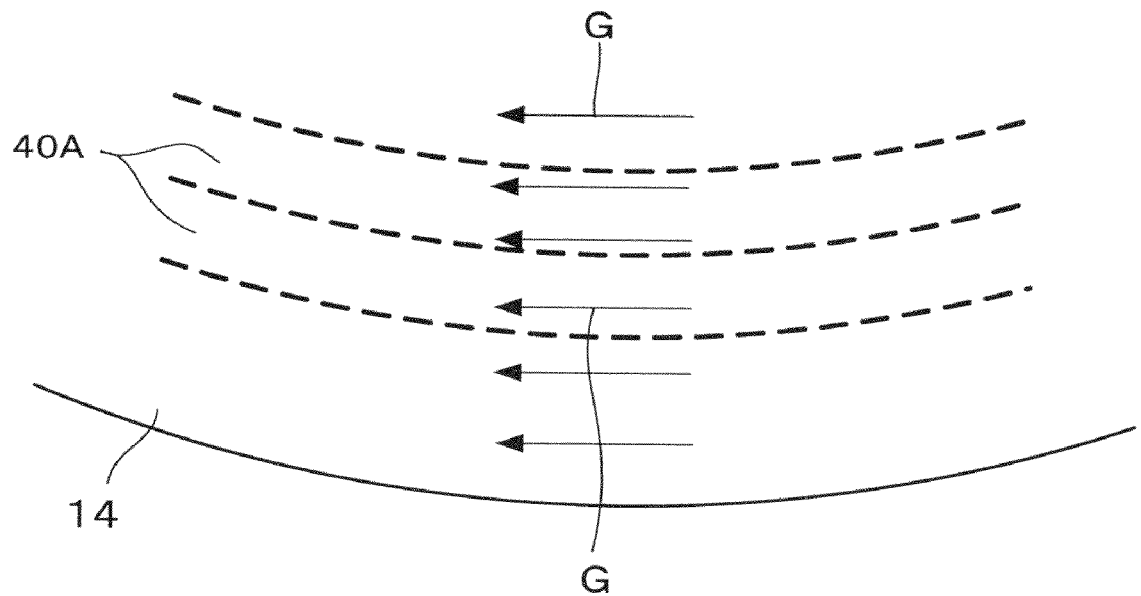
FIG. 9 is a diagram showing a relationship between circumferential tracks and magnetic force lines.

As to magnetic transfer by means of the master disk 10, there is a case where magnetic transfer is carried out on either surface of the slave disk 14, with the master disk 10 closely attached to either surface of the slave disk 14, and although not depicted, there is a case where simultaneous magnetic transfer is carried out on both surfaces of the slave disk 14, with a pair of master disks 10 closely attached to both surfaces of the slave disk 14. In the magnetic field generator 30 for applying transfer magnetic fields, electromagnetic devices 34 and 34 each of which includes a coil 33 wound around a core 32 that has a gap 31 extending in the radial direction of the slave disk 14 and the master disk 10 closely held together are disposed on both longitudinal sides, and transfer magnetic fields having magnetic force lines G parallel with track directions (see FIG. 9) are applied in the same direction with respect to both longitudinal sides. FIG. 9 shows a relationship between circumferential tracks 40A, 40A . . . and the magnetic force lines G.

At the time of magnetic field application, transfer magnetic fields are applied by the magnetic field generator 30 while the slave disk 14 and the master disk 10 are integrally rotated, and so a concavo-convex pattern of the master disk 10 is magnetically transferred onto the slave surface of the slave disk 14. It should be noted that besides this structure, a magnetic field generator may be rotationally moved.

As to a transfer magnetic field, a magnetic field is generated at one portion in the track directions, with such a magnetic field intensity distribution that a magnetic field intensity greater than the maximum value in an optimized transfer magnetic field intensity range (0.6 to 1.3 times the coercivity Hc of the slave disk 14) does not exist in any of the track directions, at least one portion where the magnetic field intensity is in the optimized transfer magnetic field intensity range exists in each track direction, and the magnetic field intensity in the opposite track directions to the aforesaid track directions is less than the minimum value in the optimized transfer magnetic field intensity range in any track direction position.

Figure 10B:
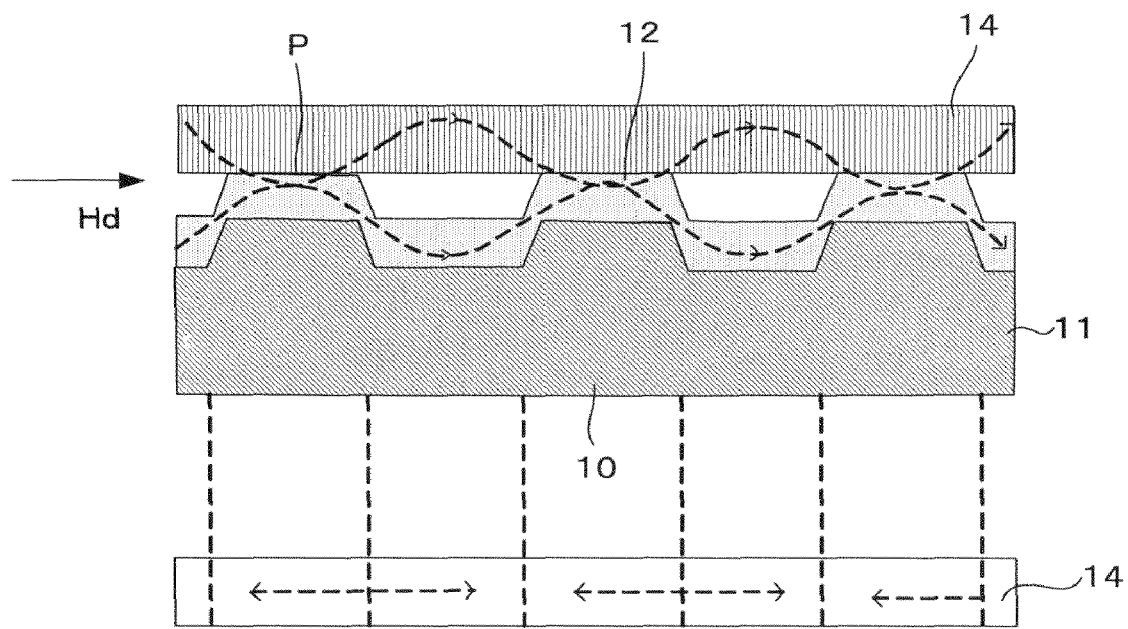
FIG. 10B is an explanatory diagram for explaining a fundamental step with respect to a magnetic transfer method by in-plane recording using a mold of the present invention.

Here, FIGS. 10A and 10B are explanatory diagrams for explaining a fundamental step with respect to a magnetic transfer method by in-plane recording using the mold (master disk) of the present invention.

First of all, as shown in FIG. 10A, an initial magnetic field Hi is previously applied to the slave disk 14 in one of the track directions, and so the slave disk 14 undergoes initial magnetization (DC demagnetization). Next, as shown in the upper figure of FIG. 10B, as the recording surface (magnetic recording portion) of this slave disk 14 and the information bearing surface of the master disk 10 where the concavo-convex pattern P is formed are closely attached to each other, the concavo-convex pattern P is magnetically transferred by applying a transfer magnetic field Hd in the track direction of the slave disk 14 in such a manner as to face the opposite direction to the initial magnetic field Hi. The magnetic field in the portion where the transfer magnetic field Hd is absorbed into the magnetic layer 12 in the convex portion of the concavo-convex pattern P is not reversed, but the magnetic field in the other portion is reversed; consequently, as shown in the lower figure of FIG. 10B, the concavo-convex pattern P of the master disk 10 is magnetically transferred onto and recorded in the magnetic recording surface of the slave disk 14. For a vertical recording medium, the concavo-convex pattern P is magnetically transferred by applying the initial magnetic field Hi in the vertical direction of the disk and then applying a transfer magnetic field Ha in the opposite direction to the initial direction.

A slave disk onto which the concavo-convex pattern P has been magnetically transferred can be suitably used, incorporated in a magnetic recording apparatus (hard disk drive).

In the magnetic transfer method, it is possible to closely attach the slave disk 14 and the master disk 10 to each other in a favorable manner and thus to conduct highly accurate magnetic transfer, by using the mold (master disk) 10 of the present invention.

According to the present invention, problems in related art can be solved, and it is possible to provide a mold which is very small in the amount of warpage and superior in flatness, a method for producing a mold in which the variation in the amount of warpage is small and a highly accurate concavo-convex pattern can be efficiently formed, and a magnetic recording medium.

EXAMPLES

The following explains Examples of the present invention; however, it should be noted that the present invention is not confined to these Examples in any way.

Example 1

Production of Mold

As shown in FIG. 5A, on a substrate 15 made of a silicon wafer whose surface is flat, smooth and clean, a resist film 16 was formed by applying an electron beam resist solution by means of spin coating, etc. and baked. Then in an electron beam exposer (not shown in the figure) provided with a highly accurate rotational stage or X-Y stage, the substrate 15 mounted on the stage was irradiated with an electron beam B modulated correspondingly to a servo signal or the like, and a desired concavo-convex pattern P' was created in the resist film 16 by means of drawing exposure.

Next, as shown in FIG. 5B, the resist film 16 underwent a developing process, and the desired concavo-convex pattern P' was formed by the residual resist film 16 from which the exposed portion had been removed. A conductive layer (not shown in the figure) was provided on this concavo-convex pattern P' by means of sputtering, and an original plate 17 which can be subjected to an electroforming process was thus produced.

Subsequently, as shown in FIG. 5C, while the original plate 17 provided with the conductive layer was rotated at a rotational speed of 50 rpm to 150 rpm, immersed in an Ni electroforming bath with the following composition, the current density of a current applied into the Ni electroforming bath was changed as shown in FIG. 6; by dosing so, an electroforming process was carried out. Specifically, the original plate 17 was electroformed at a current density of 6 A/dm$^2$ for 75 min in accordance with the current profile in FIG. 6, and then the current density was rapidly lowered to 0.1 A/dm$^2$; afterward, the current density was raised to 6 A/dm$^2$, and the original plate 17 was electroformed for 175 min. Thus, a metal plate, whose total thickness is 300 μm, composed of a first electroforming layer 11A and a second electroforming layer 11B having the same crystal orientation in which Ni (110) is the preferred orientation was formed.

—Ni Electroforming Bath Composition and Temperature—
nickel sulfamate . . . 600 g/L
boric acid . . . 40 g/L
surfactant (sodium lauryl sulfate) . . . 0.15 g/L
pH=4.0
temperature=55° C.

After that, this metal plate was separated from the original plate 17, the residual resist film 16 was removed, and then the metal plate was washed. Thus, as shown in FIG. 5D, an original plate 11' was obtained, having an inverted concavo-convex pattern P and an outer diameter of D that is the value measured before cut by punching into a predetermined size. This original plate 11' was cut by punching, the surface roughness (Ra) was made less than or equal to 1 μm by polishing the back surface thereof, and a mold 10 having a size of 2.5 inches (65 mm in disk outer diameter and 24 mm in inner diameter), shown in FIG. 5E, was thus produced.

The crystal orientation in cross section of the mold, the amount of warpage (the degree of flatness), and the variation in the amount of warpage were measured in the following manner, with respect to the mold 10 obtained. The results are shown in Table 1.

<Measurement of Crystal Orientation>

The crystal orientation in cross section of the mold was measured in accordance with an EBSD (electron backscatter diffraction) process. Specifically, the crystal orientation in cross section of the mold according to an EBSD IPF (inverse pole figure) image was measured using an EBSD measuring apparatus (JSM-6500F, TSL OIM orientation analyzing apparatus, produced by JEOL Ltd). As a result, it was confirmed that first and second electroforming layers from the concavo-convex pattern side had the same crystal orientation in which Ni (110) was the preferred orientation.

<Measurement of Amount of Warpage>

The amount of warpage was measured by fixing the mold to a spindle motor and rotating the mold at a rotational speed of 10 rpm. A laser displacement meter (LC-2430, produced by Keyence Corporation) was set in such a manner as to be perpendicular to the surface of the mold, and the amount of displacement in the vertical direction with respect to one rotation in the radial position was measured; afterward, as the laser displacement meter was shifted in the radial direction on a 1 mm basis with a stepping motor, the whole surface (radial position=12.5 mm to 32.5 mm) was measured. Then the average value of data was calculated by the radius, and the difference between the maximum and minimum values when the radii and the average values were plotted was defined as the amount of warpage.

The aforesaid amount of warpage relates to a deformation in which an inner circumferential site and an outer circumferential site of the mold differ in height even when there is no distortion during one rotation of the mold 10, namely on one track, which is exemplified by a spherical deformation. Therefore, the amount of warpage was calculated as the difference between the track with the highest displacement value and the track with the lowest displacement value, when the displacement values measured in relation to each concentric track by the laser displacement meter were averaged in the aforesaid measurement of the amount of distortion.

[Evaluation Standard]
A: very favorable
B: favorable
C: somewhat inferior
D: inferior <Measurement of Variation in Amount of Warpage>

Five molds according to the mold of Example 1 were produced, then the amount of warpage was measured with respect to these five molds in accordance with the aforesaid measuring method of the amount of warpage, the average value thereof was calculated, and the variation in the amount of warpage (σ) was calculated from the following equation.

$$\sigma = \sqrt{\frac{1}{n}\sum_{i=1}^{n}(x_i - x_{ave})^2}$$

[Evaluation Standard]
A: very favorable
B: favorable
C: somewhat inferior
D: inferior Example 2

Production of Mold

A mold of Example 2 was produced in a similar manner to Example 1, except that the condition of the electroforming process in Example 1 was changed to such a condition that electroforming was conducted in three cycles at a current density of 6 A/dm$^2$ for 70 min each.

The crystal orientation in cross section of the mold, the amount of warpage (the degree of flatness), and the variation in the amount of warpage were measured in a similar manner to Example 1, with respect to the mold of Example 2 obtained. The results are shown in Table 1.

As a result of an EBSD IPF image whereby the crystal orientation in cross section of the mold of Example 2 was measured, it was confirmed that first, second and third electroforming layers from the concavo-convex pattern side had the same crystal orientation in which Ni (110) was the preferred orientation.

Example 3

Production of Mold

A mold of Example 3 was produced in a similar manner to Example 1, except that the condition of the electroforming process in Example 1 was changed to such a condition that after electroforming was conducted in two cycles at a current density of 6 A/dm$^2$ for 95 min each, the current density was raised to 15 A/dm$^2$ and sustained for 10 min.

The crystal orientation in cross section of the mold, the amount of warpage (the degree of flatness), and the variation in the amount of warpage were measured in a similar manner to Example 1, with respect to the mold of Example 3 obtained. The results are shown in Table 1.

As a result of an EBSD IPF image whereby the crystal orientation in cross section of the mold of Example 3 was measured, it was confirmed that first and second electroforming layers from the concavo-convex pattern side had the same crystal orientation in which Ni (110) was the preferred orientation, and that a third electroforming layer from the concavo-convex pattern side had a crystal orientation in which Ni (100) was the preferred orientation.

Example 4

Production of Mold

A mold of Example 4 was produced in a similar manner to Example 1, except that the condition of the electroforming process in Example 1 was changed to such a condition that electroforming was conducted in three cycles at a current density of 6 A/dm$^2$ for 47 min each, and then electroforming was conducted at a current density of 6 A/dm$^2$ for 63 min in a fourth cycle.

The crystal orientation in cross section of the mold, the amount of warpage (the degree of flatness), and the variation in the amount of warpage were measured in a similar manner to Example 1, with respect to the mold of Example 4 obtained. The results are shown in Table 1.

Figure 11:
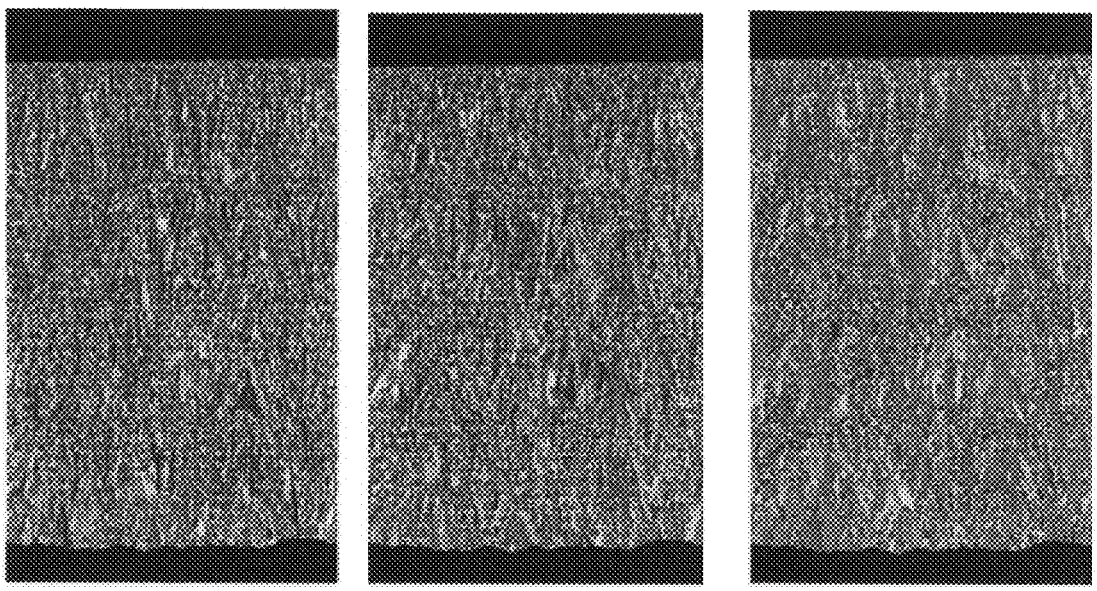
FIG. 11 is an EBSD IPF image in cross section of a mold of Example 4.

FIG. 11 shows an EBSD IPF image whereby the crystal orientation in cross section of the mold of Example 4 was measured. In FIG. 11, the left figure, the center figure and the right figure correspond to the X-axis, the Y-axis and the Z-axis respectively, and the orientational state of a crystal orientation of Ni can be observed by means of the right figure showing the Z-axis direction. In FIG. 11, the upper side represents the concavo-convex pattern side, and red, blue and green denote crystal orientations of Ni (100), Ni (111) and Ni (110) respectively. As a result of FIG. 11, it was confirmed that as to the mold of Example 4, first, second, third and fourth electroforming layers from the concavo-convex pattern side had the same crystal orientation in which Ni (110), colored green, was the preferred orientation.

Comparative Example 1

Production of Mold

A mold of Comparative Example 1 was produced in a similar manner to Example 1, except that the condition of the electroforming process in Example 1 was changed to such a condition that electroforming was conducted at a current density of 6 A/dm$^2$ for 230 min.

The crystal orientation in cross section of the mold, the amount of warpage (the degree of flatness), and the variation in the amount of warpage were measured in a similar manner to Example 1, with respect to the mold of Comparative Example 1 obtained. The results are shown in Table 2.

Figure 12:
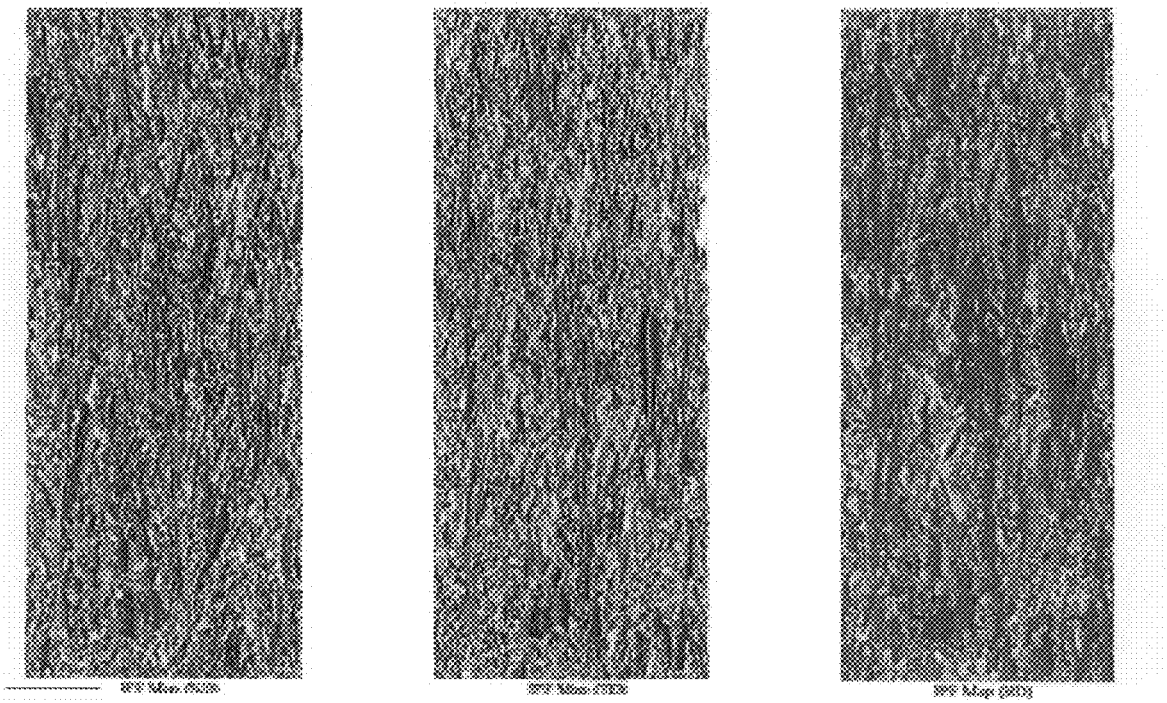
FIG. 12 is an EBSD IPF image in cross section of a mold of Comparative Example 1.

FIG. 12 shows an EBSD IPF image whereby the crystal orientation in cross section of the mold of Comparative Example 1 was measured. As a result of FIG. 12, it was confirmed that as to the mold of Comparative Example 1, an electroforming layer of a single-layer structure had a crystal orientation in which Ni (110), colored green, was the preferred orientation.

Comparative Example 2

Production of Mold

A mold of Comparative Example 2 was produced in a similar manner to Example 1, except that the condition of the electroforming process in Example 1 was changed to such a condition that after electroforming was conducted at a current density of 6 A/dm$^2$ for 30 min, the current density was raised to 20 A/dm$^2$ in 5 min and sustained for 58 min.

The crystal orientation in cross section of the mold, the amount of warpage (the degree of flatness), and the variation in the amount of warpage were measured in a similar manner to Example 1, with respect to the mold of Comparative Example 2 obtained. The results are shown in Table 2.

Figure 13:
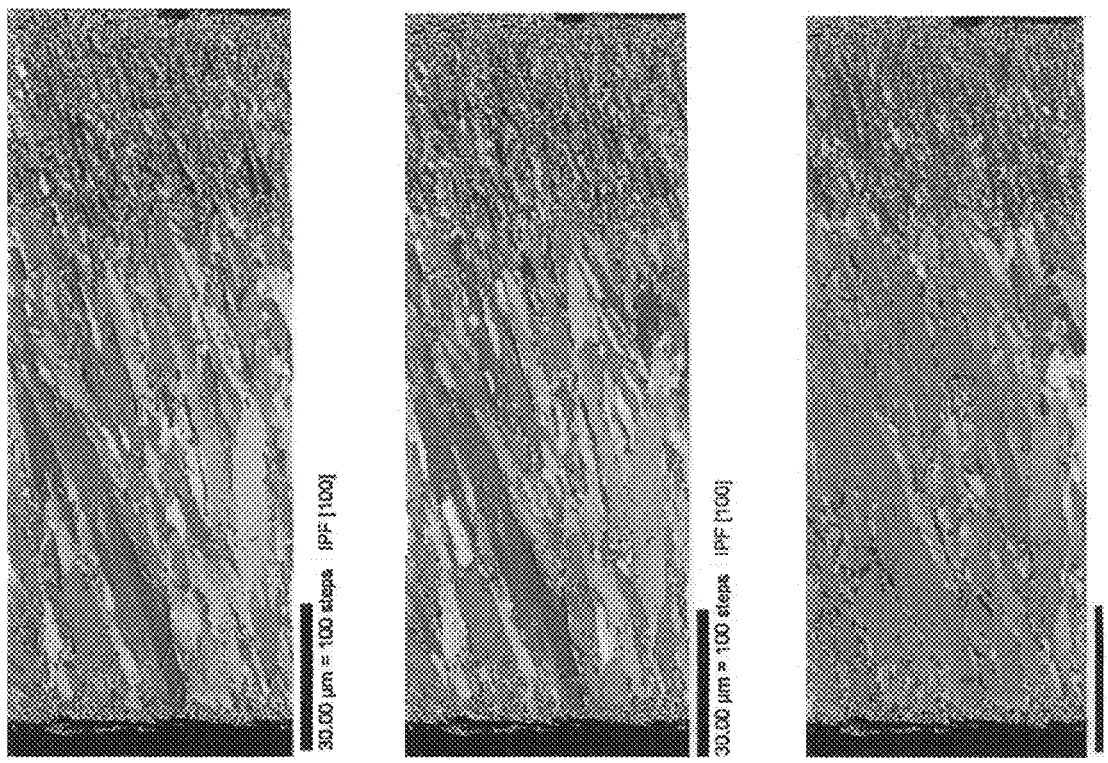
FIG. 13 is an EBSD IPF image in cross section of a mold of Comparative Example 2.

FIG. 13 shows an EBSD IPF image whereby the crystal orientation in cross section of the mold of Comparative Example 2 was measured. As a result of FIG. 13, it was confirmed that as to the mold of Comparative Example 2, a first electroforming layer from the concavo-convex pattern side had a crystal orientation in which Ni (110), colored green, was the preferred orientation, and a second electroforming layer therefrom had a crystal orientation in which Ni (100), colored red, was the preferred orientation.

Comparative Example 3

Production of Mold

A mold of Comparative Example 3 was produced in a similar manner to Example 1, except that the condition of the electroforming process in Example 1 was changed to such a condition that electroforming was conducted at a current density of 6 A/dm$^2$ for 30 min., then the current density was raised to 20 A/dm$^2$ in 5 min. and sustained for 50 min., and subsequently the current density was lowered to 6 A/dm$^2$ and sustained for 10 min.

The crystal orientation in cross section of the mold, the amount of warpage (the degree of flatness), and the variation in the amount of warpage were measured in a similar manner to Example 1, with respect to the mold of Comparative Example 3 obtained. The results are shown in Table 2.

As a result of an EBSD IPF image whereby the crystal orientation in cross section of the mold of Comparative Example 3 was measured, it was confirmed that a first electroforming layer from the concavo-convex pattern side had a crystal orientation in which Ni (110) was the preferred orientation, a second electroforming layer therefrom had a crystal orientation in which Ni (100) was the preferred orientation, and a third electroforming layer therefrom had a crystal orientation in which Ni (110) was the preferred orientation.

TABLE 1

|  | Example 1 | | Example 2 | | Example 3 | | Example 4 | |
| --- | --- | --- | --- | --- | --- | --- | --- | --- |
| Crystal orientation and thickness of electroforming layer | Ni (110) | 90 μm | Ni (110) | 100 μm | Ni (110) | 130 μm | Ni (110) | 70 μm |
|  | Ni (110) | 210 μm | Ni (110) | 100 μm | Ni (110) | 130 μm | Ni (110) | 70 μm |
|  | none | | Ni (110) | 100 μm | Ni (100) | 40 μm | Ni (110) | 70 μm |
|  | none | | none | | None | | Ni (110) | 90 μm |
| EBSD figure | — | | — | | — | | FIG. 11 | |

TABLE 1-continued

|  | Example 1 | | Example 2 | | Example 3 | | Example 4 | |
| --- | --- | --- | --- | --- | --- | --- | --- | --- |
| Amount of warpage | 45 μm | B | 30 μm | C | −13 μm | A | 4 μm | A |
| Variation (σ) | 12 μm | B | 10 μm | A | 10 μm | A | 5 μm | A |

TABLE 2

|  | Comparative Example 1 | | Comparative Example 2 | | Comparative Example 3 | |
| --- | --- | --- | --- | --- | --- | --- |
| Crystal orientation and thickness of electroforming layer | Ni (110) | 300 μm | Ni (110) | 60 μm | Ni (110) | 50 μm |
|  |  |  | Ni (100) | 240 μm | Ni (100) | 240 μm |
|  |  |  | none | | Ni (110) | 10 μm |
| EBSD figure | FIG. 12 | | FIG. 13 | | — | |
| Amount of warpage | 80 μm | D | −41 μm | C | −10 μm | B |
| Variation (σ) | 40 μm | D | 35 μm | D | 16 μm | C |

In Tables 1 and 2, "+" and "−" of the amount of warpage mean opposite directions in which the mold is warped.

Since it is very small in the amount of warpage and superior in flatness, the mold of the present invention can be suitably used for any one of a stamper for a discrete track medium, a stamper for a patterned medium and a master disk for magnetic transfer. For example, the mold of the present invention can be applied to the production of magnetic recording media having recording layers with concavo-convex patterns such as discrete track media and patterned media, palm-type magnetic recording media having recording layers with continuous concavo-convex patterns, magneto-optical recording media, optical recording media, hard disks and semiconductor products.

What is claimed is:

1. A mold comprising:
   at least two electroforming layers,
   wherein the mold has a concavo-convex pattern on a surface thereof, and
   the electroforming layers include at least two adjacent layers having the same crystal orientation.

2. The mold according to claim 1, wherein each of the electroforming layers comprises Ni.

3. The mold according to claim 2, wherein the at least two adjacent layers have the same crystal orientation in which Ni (110) is a preferred orientation.

4. The mold according to claim 2, wherein the electroforming layers include at least three layers, and at least first and second layers from a side of the concavo-convex pattern have the same crystal orientation in which Ni (110) is a preferred orientation.

5. The mold according to claim 1, wherein the mold has an amount of warpage of less than or equal to ±50 μm.

6. The mold according to claim 1, wherein a total thickness of the electroforming layers is 100 μm to 350 μm.

7. The mold according to claim 1, wherein the mold is any one of a stamper for a discrete track medium, a stamper for a patterned medium, or a master disk for magnetic transfer.

8. A method for forming a concavo-convex pattern, comprising:
   placing a mold on a surface of a resin layer disposed on a substrate so as to transfer a concavo-convex pattern of the mold onto the resin layer,
   wherein the mold has the concavo-convex pattern on a surface thereof, and the mold comprises at least two electroforming layers including at least two adjacent layers having the same crystal orientation.

9. A method for recording a magnetic recording medium, comprising:
   recording at least one of a track for recording data or servo information on the magnetic recording medium by using a mold,
   wherein the mold has a concavo-convex pattern on a surface thereof, and the mold comprises at least two electroforming layers including at least two adjacent layers having the same crystal orientation.

* * * * *